United States Patent Office 2,967,425
Patented Jan. 10, 1961

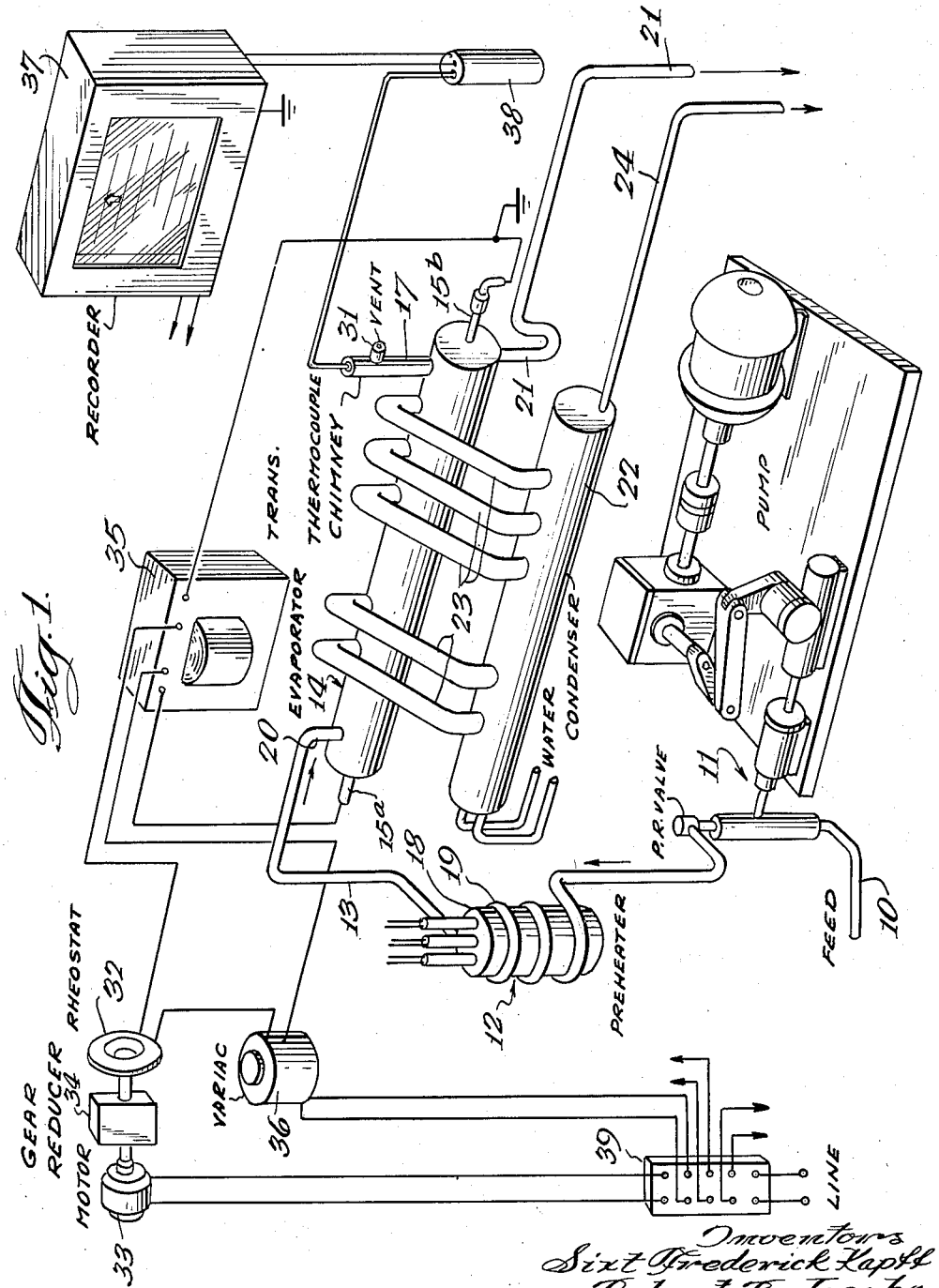

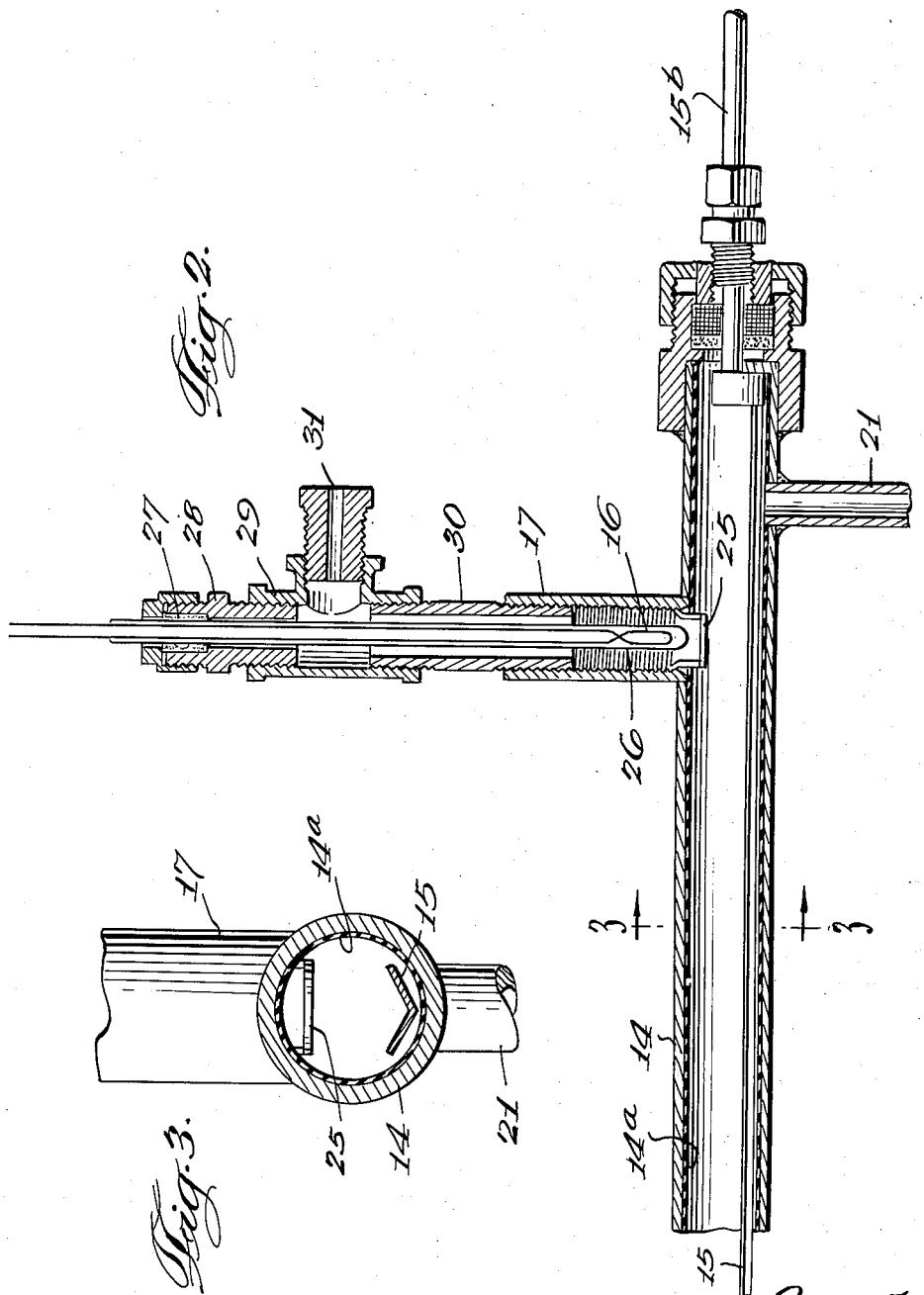

2,967,425

CONTINUOUS END POINT INSTRUMENT AND METHOD

Sixt Frederick Kapff and Robert B. Jacobs, Homewood, Ill., assignors to Standard Oil Company, Chicago, Ill., a corporation of Indiana Filed Aug. 30, 1956, Ser. No. 607,002

8 Claims. (Cl. 73—53)

This invention relates to an instrument for continuously measuring and recording the end point of a sample of a hydrocarbon distillate.

In the production of petroleum distillates, the primary specifications are those based on distillation properties. The high temperature end of the distillation curve is defined by specifying the highest temperature permissible for a given product when distilled according to ASTM procedures (ASTM Test D-158-53). This maximum temperature obtained by distilling the product to dryness is called the end point for that product.

Limitations are placed upon the end points of products, such as kerosenes and heater oils, to prevent contamination with higher boiling products. However, there frequently is considerable economical incentive to produce distillates having end points as close to the specification limit as possible. In order to approach such specification limits, it has heretofore been the practice to make laboratory analyses of grab samples, but such laboratory control of processing involves such long time lags between sampling, analysis, reporting and adjustment of the processing unit that close control of the unit has been impossible. Consequently, the specification limit could not be as closely approached as might be desired because of danger of producing off-specification product while waiting for the laboratory results.

It is, therefore, an object of this invention to provide a system which will give the process unit operator a continuous reading of the end point to permit close control of the unit. A further object of the invention is to provide an apparatus which will determine the end point and make a record of such determination. Still another object of the invention is to provide an apparatus which will, in a continuous manner, determine the end point of a hydrocarbon distillate. A more particular object of our invention is to provide an apparatus which will determine the end point of hydrocarbon fluids, record the results of such determination, and automatically control the operating conditions of the processing unit which produced the hydrocarbon fluid under test. Still another object of the invention is to provide a system for end point analysis which minimizes the time lag between sampling and process control. These and other objects of our invention will become apparent as the description thereof proceeds.

Briefly, according to our invention, we provide a continuous and point instrument which includes a constant rate feed pump, a feed preheater which discharges into an inclined evaporator, the evaporator having an electrically insulating coating and including an electrical ribbon heater extending lengthwise in the bottom thereof. A condenser, connected by several transfer chimneys from the top of the evaporator receives the distillate. At the down-stream end of the evaporator a thermocouple is mounted in terminal vent chimney. The temperature sensed by the thermocouple is recorded and by cycling the heat input to the ribbon heater a maximum temperature is attained as the evaporator runs dry. The maximum temperature observed is correlated with the results obtained by ASTM Test D-158-53 and is the end point of the sample.

The advantages and additional details of our apparatus will be described by reference to the accompanying drawings forming a part of this specification and wherein:

Figure 1 is a schematic diagram of one embodiment of the invention;

Figure 2 is an enlarged view of the thermocouple assembly and terminal end of the evaporator; and Figure 3 is a section taken along the line 3—3 in Figure 2.

Referring to the drawings, the continuous instrument is connected to a process stream 10. The pump 11 flows the sample from line 10 through the preheater 12, the preheated liquid flow being supplied by conduit 13 to the upper inlet end of the inclined evaporator 14. The pump 11 serves to supply a constant flow of test liquid and the temperature of the preheated liquid is raised within the evaporator 14 as it flows along the bottom thereof about strip heater 15 until dryness is attained at the lower outlet end of the evaporator 14. The heater 15 cycles continuously from low heat to high heat to off in such a manner that the sample material is all evaporated before the highest temperature level is reached.

A thermocouple 16 in the chimney 17 serves to record the temperature of the vapors off the hot end of the heater 15. When this end runs dry, the thermocouple 16 is cooled and the temperature begins to fall because no more vapor is being formed to heat it. This maximum thermocouple temperature is correlated with the end point of the process liquid.

The preheater 12 consists of a thermostated copper block 18 and a coil 19 of stainless steel tubing wound around the outside of block 18 and soldered for good thermal contact.

The evaporator 14 includes inlet 20 to which the constant flow of preheated liquid from line 13 is introduced. The evaporator 14 is sloped gently away from the inlet 20 and the liquid runs toward the drain 21 while being further heated by the ribbon heater 15 lying in the liquid stream which flows from the inlet 20 to the drain 21. During the heating process, vapors are evolved and pass off to the condenser 22 by the transfer chimneys 23. The unevaporated material is then run to a sump through the drain 21 and condensate from condenser 22 is run off through drain 24.

As the heater temperature is increased, the thermocouple temperature rises in response to the heat it receives from the condensing vapors reaching terminal chimney 17. At the dry point no further vapors reach the thermocouple 16 since such vapors have passed off from the evaporator 14 by means of the other chimneys 23 upstream from the terminal chimney 17 which contains the thermocouple 16. Therefore, the temperature of the thermocouple 16 is independent of the temperature of the heater 15 at the time it is turned off.

Referring to Figure 2, we have shown the details of the thermocouple assembly. The object of the arrangement shown is to insure that the thermocouple 16 is heated only by condensing vapors and not by radiation or convection from the heater 15. To this end, a radiation shield 25 is disposed across the lower end of the chimney 17 and this shield 25 prevents heating of the thermocouple tube 26 by radiation at the dry point.

The thermocouple 16 is contained in a sealed glass tube 26 and supported at its upper end by a Teflon gasket 27 and a fitting 28 which is secured to the T-joint 29 and which in turn is connected to the housing 30 forming a part of the chimney 17. The chimney 17 is sealed except for a small vent orifice 31 threaded into the T-joint 29, such vent 31 permitting the condensing vapors to reach the thermocouple tube 26 while preventing any large rush of hot gases from the heater 15 after dryness is reached.

The wiring diagram for the heater 15 and the means by which the heater 15 is cycled is shown in Figure 1. This includes a rheostat 32 connected in series with the heater 15 and rotated continuously by a motor 33 at a speed of about ⅕ r.p.m. through the gear reducer 34. As the rheostat resistance becomes less, more current is supplied to the heater 15 until a maximum is reached. Then the heater 15 is automatically turned off for a short period after which the heating cycle is repeated. The transformer 35 controls the voltage applied to the strip heater 15 and the current supply to the rheostat 32 is in turn supplied by the variac control 36 to give a maximum wattage of about 600 watts at the heater 15.

In a typical operation of this instrument, the preheater 12 is operated to bring the test liquid to a temperature in the range of 150°–175° C. The total heater cycle time is about five minutes with an off-time of about one minute.

A typical flow rate through the instrument, as determined by the pump 11, is of the order of 30 cc. per minute and a suitable orifice size for a vent 31 in the chimney 17 is about 0.004 inch.

Any suitable recorder 37 may be used wherein the sensitivity is such that about one unit is equivalent to a temperature difference of about 5° C. at the thermocouple 16 in the chimney 17.

Although the invention has been described with reference to an embodiment thereof, this is by way of illustration only and it is contemplated that modifications can be made in the system without departing from the spirit of our invention.

What we claim is:

1. In a system for continuous end point determination including an evaporator unit, pump means for introducing a sample of liquid into said unit, means for initially providing a pool of liquid in said unit, heating means for vaporizing said pool of liquid in said unit, means for measuring the temperature of evolved vapors discharged from an upper part of said unit, means shielding said last named means from exposure to radiant heat from said heating means, and means for cycling the output of said heating means.

2. A system for determining the end point of hydrocarbon liquid samples which comprises an evaporator unit into which the liquid sample flows for determination of the end point, a low heat capacity heater in a lower part of said unit capable of vaporizing the sample to dryness, a thermocouple located in a vapor vent line from an upper part of said unit disposed to measure the temperature of vapors escaping therefrom, a recorder to indicate such vapor temperature, radiant heat deflector means interposed said thermocouple and said heater, and means for cycling said heater.

3. A continuous end point instrument which includes a constant rate feed pump, an inclined evaporator, an electrical ribbon heater extending lengthwise along the bottom of said evaporator, condenser means connected by vapor transfer lines from the top of the evaporator, a vent chimney adjacent the terminal end of said evaporator, thermocouple means within said vent chimney, means for cycling the heat input to the ribbon heater, and means for recording the maximum temperature attained in the said chimney when the evaporator runs dry.

4. A continuous end point instrument which includes a constant rate feed pump, a feed preheater discharging into an inclined evaporator, the evaporator having an electrically insulating coating and including an electrical ribbon heater extending lengthwise along the bottom thereof, transfer line means for the top of the evaporator removing vapors therefrom, a vent chimney adjacent the terminal end of said evaporator, a restrictive vent orifice in said chimney, thermocouple means within said vent chamber, means for cycling the heat input to the ribbon heater, and means for recording the maximum temperature attained in the said chimney during the test, the maximum temperature observed corresponding to the end point of the sample as determined by ASTM Test D–158–53.

5. An apparatus for conducting continuous end point determinations correlatable with end points obtained according to ASTM Test D–158–53 which comprises in combination preheater means, pump means supplying sample liquid to the preheater means, an evaporator means, conduit means delivering preheated liquid from said preheater to said evaporator means, said evaporator means comprising an inclined tubular chamber, electrical heating means disposed along the bottom of said tubular chamber, a plurality of vapor chimneys communicating with said tubular chamber, condenser means into which said chimneys discharge, a vent chimney communicating with the lower end of said tubular chamber, a restrictive orifice vent in said vent chimney, thermocouple means within said vent chimney up-stream of said orifice vent, heat shield means disposed across the lower end of said vent chimney, electrical means for cyclically controlling said electrical heating means, and recorder means for indicating the peak vapor temperature sensed by said thermocouple in said vent chimney.

6. The method of continuously ascertaining the end point of a flowing hydrocarbon liquid stream which comprises the steps of supplying the liquid sample at a constant rate into a distililation zone, initially providing a pool of liquid in said zone, cyclically applying heat to the distillation zone to vaporize the pool of liquid to dryness, said cyclic application of heat being applied over the ranges of low heat to high heat to off through a high level sufficient to vaporize the liquid at a greater rate than the rate of introduction of the liquid stream into the distillation zone in such a manner that the sample liquid is all evaporated before the highest temperature level is reached, withdrawing vapors continuously from the upper part of said distillation zone, and measuring the maximum temperature of the said withdrawn vapors as an indication of the end point.

7. An instrument for determining the distillation end point of a liquid which comprises in combination constant feed means, evaporator means, electric heater means disposed along the bottom of said evaporator means, condenser means connected by vapor transfer line means from the top of said evaporator means, a vent chimney from said evaporator means, means for withdrawing unvaporized liquid from said evaporator means, thermocouple means within said vent chimney, means for cycling the heat input to the said heater means, radiant heat shield means interposed said thermocouple means and said heater means, and means connected to said thermocouple means for recording the maximum temperature attained in the said vent chimney as an indication of the distillation end point of the liquid under test.

8. The method of continuously ascertaining the end point of a hydrocarbon liquid stream which comprises the steps of supplying the liquid sample at a constant rate into a distillation zone, initially providing a pool of liquid in said zone, applying heat to the distillation zone to vaporize said pool of liquid to dryness, withdrawing vapors continuously from the upper part of said distillation zone, withdrawing a portion of the vapors in a restricted stream, cycling the heat input to the distillation zone through a high level sufficient to vaporize the liquid sample at a greater rate than the rate of introduction of the liquid stream into the distillation zone, and measuring the maximum temperature of said vapors flowing in said restricted stream as an indication of the end point.

References Cited in the file of this patent

UNITED STATES PATENTS

| | | |
|---|---|---|
| 1,014,139 | Freeman | Jan. 9, 1912 |
| 1,307,601 | Saunders | June 24, 1919 |
| 1,632,748 | Parsons et al. | June 14, 1927 |
| 2,116,442 | McCluer | May 3, 1938 |

OTHER REFERENCES

Industrial and Engineering Chemistry, vol. 17, pages 679–683, by Stevenson and Stark, 1925.